United States Patent
Hunt et al.

(10) Patent No.: US 8,364,630 B1
(45) Date of Patent: Jan. 29, 2013

(54) SYSTEM AND METHOD FOR CONTROLLING NETWORK CENTRIC OPERATION WITH BAYESIAN PROBABILITY MODELS OF COMPLEX HYPOTHESIS SPACES

(75) Inventors: Jeffrey H. Hunt, Thousand Oaks, CA (US); David Roderick Gerwe, Woodland Hills, CA (US)

(73) Assignee: The Boeing Company, Chicago, IL (US)

( * ) Notice: Subject to any disclaimer, the term of this patent is extended or adjusted under 35 U.S.C. 154(b) by 564 days.

(21) Appl. No.: 12/610,926

(22) Filed: Nov. 2, 2009

(51) Int. Cl.
*G06F 15/00* (2006.01)
*G06F 15/18* (2006.01)

(52) U.S. Cl. .............. 706/62; 706/45; 706/46; 706/52

(58) Field of Classification Search .................. None
See application file for complete search history.

(56) References Cited

U.S. PATENT DOCUMENTS

| | | | |
|---|---|---|---|
| 7,035,764 B2* | 4/2006 | Rui et al. | 702/179 |
| 2007/0211917 A1* | 9/2007 | Nakano et al. | 382/103 |
| 2009/0147994 A1* | 6/2009 | Gupta et al. | 382/103 |

OTHER PUBLICATIONS

Chickering et al., "Efficient Approximations for the MArginal Likelihood of Bayesian Networks with Hidden Variables", Machine Learning 29, 1997, pp. 181-212.*
Feldman, "Bayesian Contour Integration, Perception & Psychophysics", 2001, pp. 1171-1182.*

* cited by examiner

*Primary Examiner* — Omar Fernandez Rivas
(74) *Attorney, Agent, or Firm* — Caven & Aghevli LLC

(57) ABSTRACT

The system contains a plurality of sensors outputting sensor data. A processor is in communication with the sensors to receive the sensor data. A logic system is in communication with the processor. The logic system evaluates a likelihood of a plurality of hypotheses, generates a representation of the likelihood of the plurality of hypotheses in a coordinate system, and connects trajectories between a plurality of discrete hypothesis aspects of the plurality of hypotheses. An output of the processor provides at least one likely outcome and a confidence level for each of the likely outcomes. At least one likely outcome is selected based on contours of the representation of the likelihood to of the plurality of hypotheses in the coordinate system.

17 Claims, 2 Drawing Sheets

SYSTEM AND METHOD FOR CONTROLLING NETWORK CENTRIC OPERATION WITH BAYESIAN PROBABILITY MODELS OF COMPLEX HYPOTHESIS SPACES

FIELD

The present disclosure is generally related to sensory data processing, and more particularly is related to a system and method for a system and method for controlling network centric operation with Bayesian probability models of complex hypothesis spaces.

BACKGROUND

In the algorithmic control of network centric operations, it is important to have efficient means to determine identities of elements within a physical battlespace. Since networks are fundamentally stochastic in nature, the algorithmic calculations must be stochastic as well. Typically, this involves multi sensor fusion and multiple locations of data that have to be fused. Presently, there are many different types of fusion algorithms, but none has emerged as a baseline to be used in all scenarios. Present fusion algorithms are either fast but have outputs with weak levels of confidence, or produce high quality characterizations that take very long times to compute.

Bayesian analysis utilizes statistics weighted by experience. While not ideal for statistical analysis in situations with exact binary outcomes, Bayesian analysis can be very useful in situations where not all the variables are known or defined but in which the final state of those variables is well known and defined. Its usefulness in these latter situations is based on its ability to infer experienced final states and then determine the statistical probability of the preferred state without knowing the statistical probability of the underlying states. Thus, simple stochastic analysis may indicate that state 2 has a ½5 chance of being the final state of a 25 state system, but if experience shows state 2 occurs 80% of the time, a simplified Bayesian analysis would suggest that state 2 actually has an 80% chance of occurring again. A key element of Bayesian analysis is that prior beliefs must be stated and well-defined because they will greatly affect the outcome of the analysis. Problems with technologies utilizing this method involve the requirement of prior beliefs and experience with which to weight the statistical probabilities, the accuracy and validity of these prior beliefs and experiences—there may be no consistent effort to appreciate the ability of past performance to predict future results, and the end results of the analysis may rely more on the weighting of prior experiences than the actual data itself.

Thus, a heretofore unaddressed need exists in the industry to fuse dynamic sensor data from multiple inputs in real-time.

SUMMARY

Embodiments of the present disclosure provide a system and method for controlling network centric operation. Briefly described, in architecture, one embodiment of the system, among others, can be implemented as follows. The system contains a plurality of sensors outputting sensor data. A processor is in communication with the sensors to receive the sensor data. A logic system is in communication with the processor. The logic system evaluates a likelihood of a plurality of hypotheses, generates a representation of the likelihood of the plurality of hypotheses in a coordinate system, and connects trajectories between a plurality of discrete hypothesis aspects of the plurality of hypotheses. An output of the processor provides at least one likely outcome and a confidence level for each of the likely outcomes. At least one likely outcome is selected based on contours of the representation of the likelihood of the plurality of hypotheses in the coordinate system.

The present disclosure can also be viewed as providing methods for controlling network centric operation. In this regard, one embodiment of such a method, among others, can be broadly summarized by the following steps: collecting sensor data with a plurality of sensors; outputting sensor data to a processor in communication with the sensors; analyzing the sensor data with a logic system in communication with the processor, wherein the logic system is: evaluating a likelihood of a plurality of hypotheses; generating a representation of the likelihood of the plurality of hypotheses in a coordinate system; and connecting trajectories between a plurality of discrete hypothesis aspects of the plurality of hypotheses; and outputting at least one likely outcome and a confidence level for each of the likely outcomes, wherein at least one likely outcome is selected based on contours of the representation of the likelihood of the plurality of hypotheses in the coordinate system.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

The features, functions and advantages that have been discussed can be achieved independently in various embodiments of the present disclosure or may be combined in yet other embodiments further details of which can be seen with reference to the following description and drawings. The components in the drawings are not necessarily to scale. Instead emphasis is being placed upon illustrating clearly the principles of the present disclosure. Moreover, in the drawings, like reference numerals designate corresponding parts throughout the several views.

DETAILED DESCRIPTION

Figure 1:
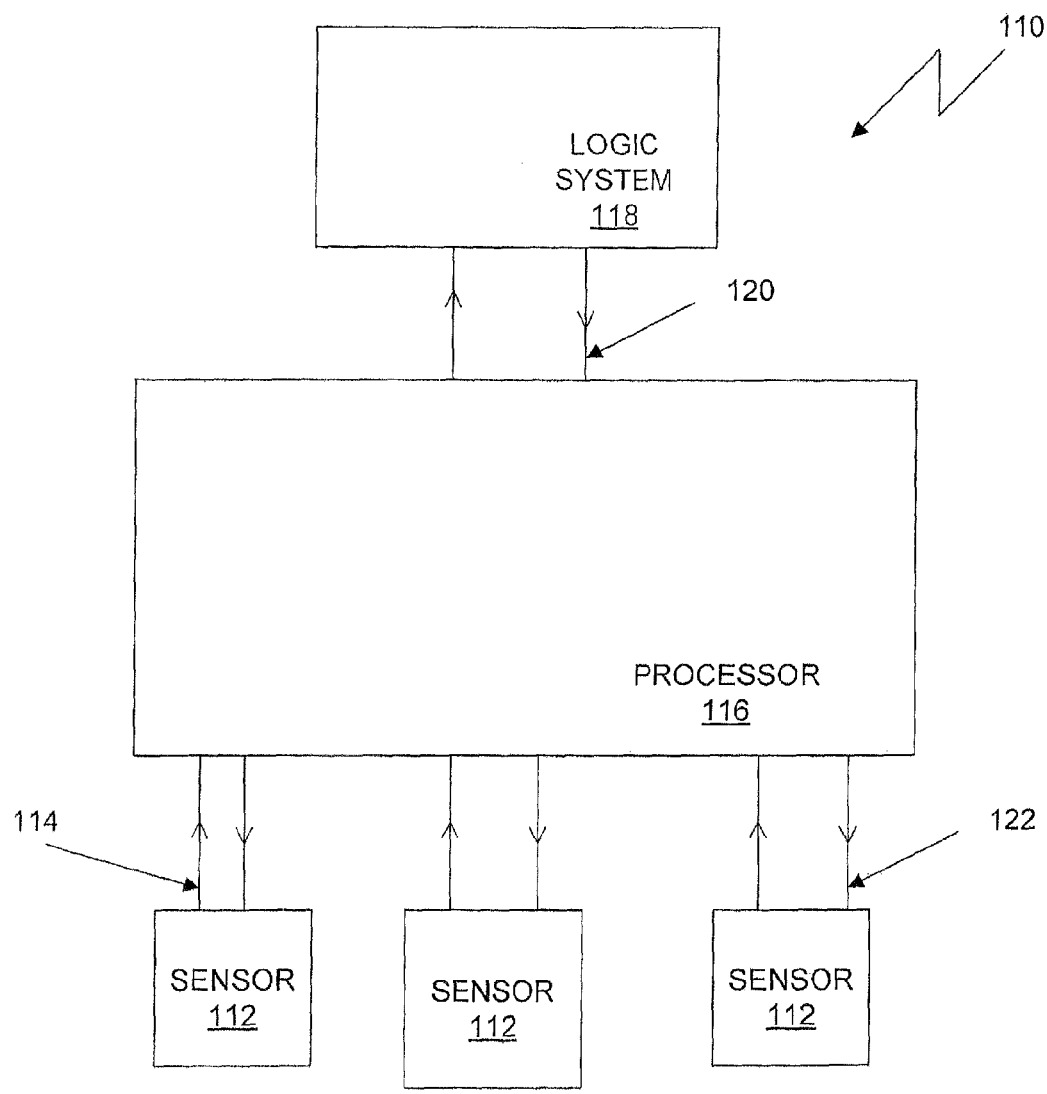
FIG. 1 is an illustration of a block diagram of a system for controlling network centric operation, in accordance with a first exemplary embodiment of the present disclosure.

FIG. 1 is an illustration of a block diagram of a system 110 for controlling network centric operation, in accordance with a first exemplary embodiment of the present disclosure. The system 110 contains a plurality of sensors 112 outputting sensor data 114. A processor 116 is in communication with the sensors 112 to receive the sensor data 114. A logic system 118 is in communication with the processor 116. The logic system 118 evaluates a likelihood of a plurality of hypotheses, generates a representation of the likelihood of the plurality of hypotheses in a coordinate system, and connects trajectories between a plurality of discrete hypothesis aspects of the plurality of hypotheses. An output 120 of the logic system 118 provides at least one likely outcome and a confidence level for each of the likely outcomes. At least one likely outcome is selected based on contours of the representation of the likelihood of the plurality of hypotheses in the coordinate system.

The plurality of sensors 112 may include, for instance, electro-optical imagery, hyperspectral, time-resolved radiometry, 3D LADAR, and vibrometry. The plurality of sensors 112 may include any sensors known to those having ordinary skill in the art. The sensor data 114 may include object orientation, object configuration, materials, temperature, motion, and payloads. Obviously the sensor data 114 may be limited by the sensors 112 available to the system 110. The sensors 112 may feed data to the processor 116 repeatedly overtime and time stamped data may be used to create additional sensor data 114, such as velocity and/or acceleration of an object; trajectory of an object; changing temperature of an object; and other characteristics of an object that may fluctuate over time. The sensor data 114 may be communicated to the processor 116 by the sensor 112 and the processor 116 may queue 122 sensors 112 to provide specific data when that data may be useful to testing a hypothesis.

The processor 116 is a hardware device for executing software, particularly that stored in a memory. The processor 116 can be any custom made or commercially available processor, a central processing unit (CPU), an auxiliary processor among several processors associated with the computer, a semiconductor based microprocessor (in the form of a microchip or chip set), a macroprocessor, or generally any device for executing software instructions. Communication between the processor 116 and the sensors 112 as well as communication between the processor 116 and the logic system 118 may be wired (including an integral wiring connection) or wireless, utilizing any type of communication that may be known to those having ordinary skill in the art. The processor 116 may fuse bits of related sensor data 114 before sending the sensor data 114 to the logic system 118.

The logic system 118 may include an ordered listing of executable instructions for implementing logical functions that can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the certain embodiments of the present invention includes embodying the functionality of the preferred embodiments of the present invention in logic embodied in hardware or software-configured mediums.

The logic system 118 may evaluate the likelihood of a hypothesis by comparing predicted behaviors of an object against measured data. The comparison may result in accepting or rejecting the hypothesis. A probability of the hypothesis may be weighted by likelihood. The logic system 118 may evaluate a plurality of hypotheses consecutively or concurrently. The use of likelihood gradients may improve trajectory, achieving improved results in fewer iterations. To check against various possibilities, trajectories of various discrete hypothesis aspects may be connected. This algorithm may unify classification and estimation and allow the exploration of complex hypothesis space with varying numbers of parameters. The trajectory of random movement through hyperdimensional space dwells at hypotheses with highest probability. An identification of clusters and probability contours indicates most likely hypotheses and confidence intervals.

Figure 2:
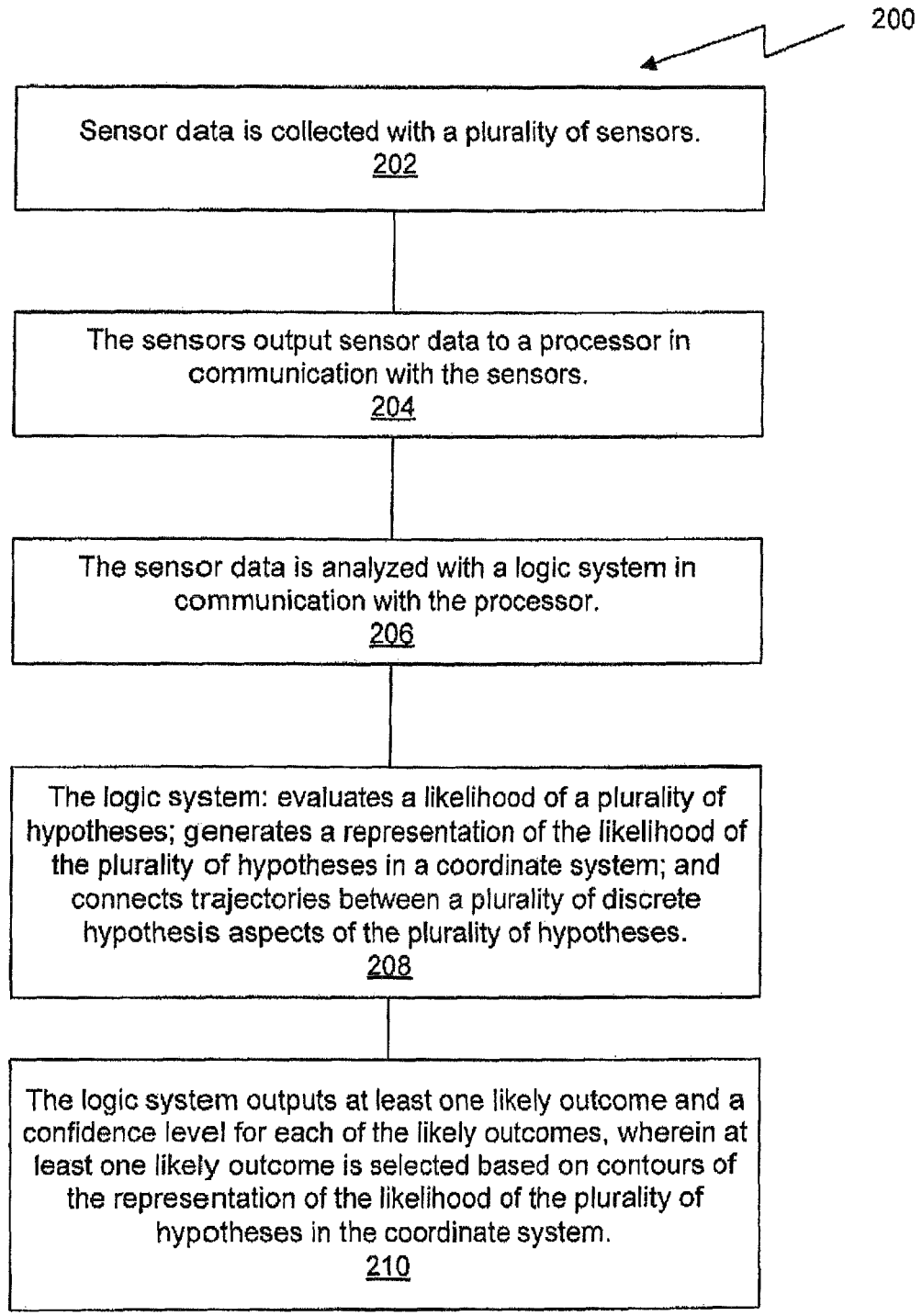
FIG. 2 is an illustration of a flowchart illustrating a method for controlling network centric operation utilizing the system of FIG. 1, in accordance with the first exemplary embodiment of the present disclosure.

FIG. 2 is an illustration of a flowchart 200 illustrating a method for controlling network centric operation utilizing the system 110 of FIG. 1, in accordance with the first exemplary embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 202, sensor data 114 is collected with a plurality of sensors 112. The sensors 112 output sensor data 114 to a processor 116 in communication with the sensors 112 (block 204). The sensor data 114 is analyzed with a logic system 118 in communication with the processor 116 (block 206). The logic system 118: evaluates a likelihood of a plurality of hypotheses; generates a representation of the likelihood of the plurality of hypotheses in a coordinate system; and connects trajectories between a plurality of discrete hypothesis aspects of the plurality of hypotheses (block 208). The logic system 118 outputs at least one likely outcome and a confidence level for each of the likely outcomes, wherein at least one likely outcome is selected based on contours of the representation of the likelihood of the plurality of hypotheses in the coordinate system (block 210).

The process may also include isolating the likely outcome with the highest confidence level. The process may include queuing 122 one of the sensors 112 to collect additional information that materially impacts the likelihood of one of the hypotheses. Once the additional information is collected, the process may include re-evaluating the likelihood of the plurality of hypotheses and outputting revised likely outcomes and confidence levels using the additional information requested. Also, the trajectories between the plurality of discrete hypothesis aspects of the plurality of hypotheses may be revised using the additional information requested.

A library of known characteristics relative to a set of known objects may be maintained in a memory in communication with the processor 116. The sensor data 114 may be compared to the known characteristics stored in the library to help determine the confidence level. Also, some sensor data 114 may be less reliable than other sensor data 114. For example, obfuscation to electro-optical imagery may make the data returned from that sensor 112 less reliable. Thus, sensor data 114 may be weighted based upon a data confidence level. Some sensors 112 may exist to determine the presence of obfuscations to other sensors 112.

It should be emphasized that the above-described embodiments of the present disclosure, particularly, any "preferred" embodiments, are merely possible examples of implementations, merely set forth for a clear understanding of the principles of the disclosed system and method. Many variations and modifications may be made to the above-described embodiments of the disclosure without departing substantially from the spirit and principles of the disclosure. All such modifications and variations are intended to be included herein within the scope of this disclosure and protected by the following claims.

What is claimed is:

1. A system for controlling network centric operation, the system comprising:
   a plurality of sensors outputting sensor data;
   a processor in communication with the sensors to receive the sensor data;
   a logic system in communication with the processor, wherein the logic system evaluates a likelihood of a plurality of hypotheses, generates a representation of the likelihood of the plurality of hypotheses in a coordinate system, and connects trajectories between a plurality of discrete hypothesis aspects of the plurality of hypotheses; and
   an output of the processor provides at least one likely outcome and a confidence level for each of the likely outcomes, wherein at least one likely outcome is selected based on contours of the representation of the likelihood of the plurality of hypotheses in the coordinate system.

2. The system of claim 1, wherein the at least one likely outcome is further selected from the hypotheses with the highest confidence level.

3. The system of claim 1, wherein the logic system is in communication with the sensors, whereby the logic system directs one of the sensors to collect information that materially impacts the likelihood of one of the hypotheses.

4. The system of claim 3, wherein the logic system re-evaluates the likelihood of the plurality of hypotheses and a revised output is produced using the information requested from the sensors.

5. The system of claim 1, wherein the sensors include at least one of the group consisting of: electro-optical imagery; hyperspectral; time-resolved radiometry; 3D LADAR; and vibrometry.

6. The system of claim 1, wherein the sensor data includes at least one of the group consisting of: object orientation; object configuration; materials; temperature; motion; and payloads.

7. The system of claim 6, wherein the processor fuses a plurality of the sensor data relative to an object for communication to the logic system.

8. A method for controlling network centric operation, the method comprising the steps of:
   collecting sensor data with a plurality of sensors;
   outputting sensor data to a processor in communication with the sensors;
   analyzing the sensor data with a logic system in communication with the processor, wherein the logic system is:
   evaluating a likelihood of a plurality of hypotheses;
   generating a representation of the likelihood of the plurality of hypotheses in a coordinate system; and
   connecting trajectories between a plurality of discrete hypothesis aspects of the plurality of hypotheses; and
   outputting at least one likely outcome and a confidence level for each of the likely outcomes, wherein at least one likely outcome is selected based on contours of the representation of the likelihood of the plurality of hypotheses in the coordinate system.

9. The method of claim 8, further comprising the step of isolating the at least one likely outcome with the highest confidence level.

10. The method of claim 8, further comprising the step of directing one of the sensors to collect additional information that materially impacts the likelihood of one of the hypotheses.

11. The method of claim 10, further comprising the steps of:
    re-evaluating the likelihood of the plurality of hypotheses; and
    outputting revised likely outcomes and confidence levels using the additional information requested.

12. The method of claim 11, further comprising the step of revising the trajectories between the plurality of discrete hypothesis aspects of the plurality of hypotheses using the additional information requested.

13. The method of claim 8, wherein the sensors include at least one of the group consisting of: electro-optical imagery; hyperspectral; time-resolved radiometry; 3D LADAR; and vibrometry.

14. The method of claim 8, wherein the sensor data includes at least one of the group consisting of: object orientation; object configuration; materials; temperature; motion; and payloads.

15. The method of claim 14, further comprising the step of fusing a plurality of the sensor data relative to an object.

16. The method of claim 8, further comprising the step of maintaining a library of known characteristics relative to a set of known objects, whereby sensor data is compared to the known characteristics to determine confidence level.

17. The method of claim 8, further comprising the step of weighting sensor data with sensor confidence levels.

* * * * *